(12) United States Patent
Smith

(10) Patent No.: US 7,549,828 B2
(45) Date of Patent: Jun. 23, 2009

(54) VEHICLE BED TIE DOWN DEVICE

(75) Inventor: Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 11/590,251

(22) Filed: Oct. 31, 2006

(65) Prior Publication Data
US 2007/0183860 A1 Aug. 9, 2007

Related U.S. Application Data

(60) Provisional application No. 60/731,778, filed on Oct. 31, 2005.

(51) Int. Cl.
B60P 7/08 (2006.01)
(52) U.S. Cl. ................. 410/106; 410/110; 410/116
(58) Field of Classification Search ............. 410/101, 410/102, 104, 106, 110, 116; 24/115 K, 24/265 CD; 248/499
See application file for complete search history.

(56) References Cited

U.S. PATENT DOCUMENTS 4,850,770 A 7/1989 Millar, Jr.
D308,627 S 6/1990 Guffey
4,953,820 A 9/1990 Yoder
D337,934 S 8/1993 Young
5,443,341 A 8/1995 Hamilton
6,039,520 A 3/2000 Cheng
6,113,328 A * 9/2000 Claucherty .................. 410/106
6,129,490 A 10/2000 Erskine et al.
6,256,844 B1 7/2001 Wheatley
6,350,089 B1 2/2002 Tekavec
6,604,898 B2 8/2003 Price
6,742,973 B1 6/2004 Hendrix et al.

* cited by examiner

Primary Examiner—Stephen Gordon
(74) Attorney, Agent, or Firm—Knobbe Martens Olson & Bear LLP

(57) ABSTRACT

A removable vehicle bed tie down device comprises a clamp body and a gripper assembly that is securely advanceable relative to the clamp body. The clamp body and the gripper assembly are shaped and configured to apply a gripping force to two intersecting walls of a bed rail of a vehicle such as a pick up truck. The clamp body includes a mount point and a rib that may be formed as an integrated unitary structure with the clamp body, thus providing high strength and stiffness with low manufacturing costs. The rib extends over substantially the entire outer surface of the clamp body and distributes loads applied to the mount point over the entire clamp body and to the gripper assembly.

18 Claims, 5 Drawing Sheets

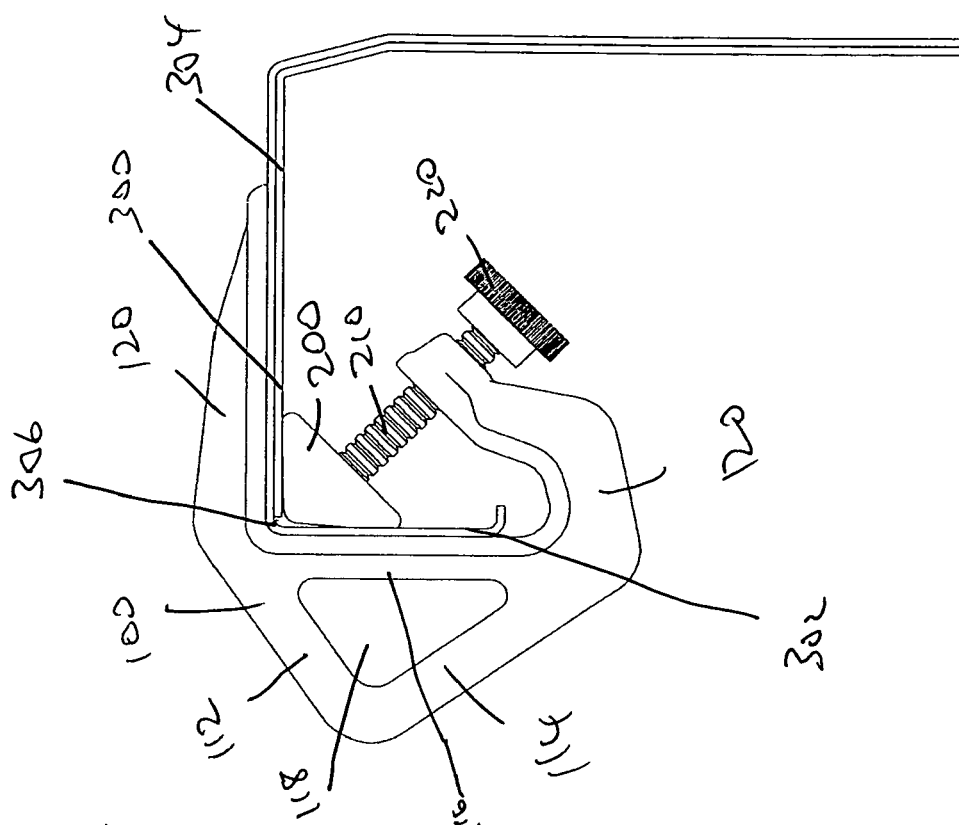
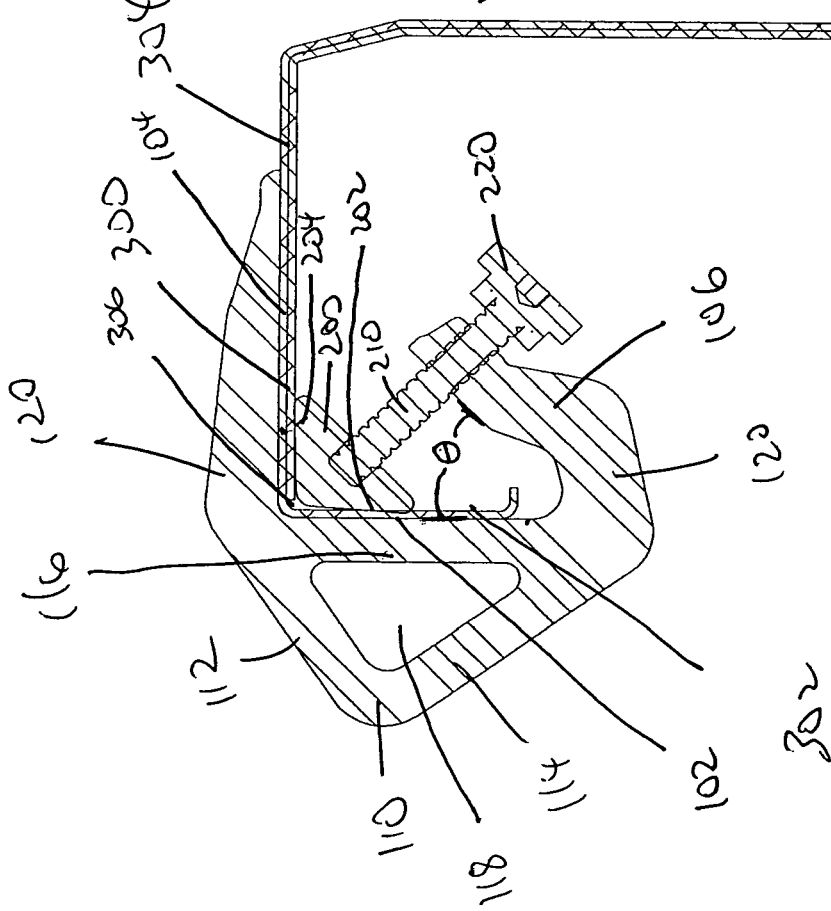
Figure 6
Figure 5

VEHICLE BED TIE DOWN DEVICE

CROSS-REFERENCE TO RELATED APPLICATIONS

This application claims the benefit of U.S. Provisional Patent Application No. 60/731,778, entitled "VEHICLE BED TIE DOWN DEVICE," filed on Oct. 31, 2005.

Also, this application hereby incorporates by reference the above-identified provisional application, in its entirety.

BACKGROUND OF THE INVENTION

1. Field of the Invention

This application relates to tie-down devices for vehicle beds and, more specifically, to tie-down devices that clamp to a rail of a vehicle bed.

2. Description of the Related Art

Vehicles such as pick up trucks offer large cargo carrying capacity in their cargo beds. Since safety concerns dictate that cargo in an open vehicle bed be secured with a rope, strap, cable, cord, or like securing device, the cargo capacity of a vehicle is often limited by a lack of tie-down points. Moreover, if any cargo-tie down points have been integrated into a vehicle bed, they are typically at fixed locations such as a front end of the vehicle bed adjacent the vehicle cabin and a back end of the vehicle bed adjacent the tailgate. While these fixed locations do allow cargo to be tied down, certain sizes and shapes of cargo may not be well secured to the bed because they are incapable of being positioned close to one or more of the fixed locations. Therefore, there is a need for a tie down for application to a vehicle bed. Furthermore, it is desirable that the tie down be movable to several locations on the vehicle bed to secure cargo of various sizes and shapes.

Many vehicle beds include side rails having at least one edge formed by two intersecting walls. Various devices have been attempted that clamp on to these rails and include tie down hooks or cleats. However, these devices generally either do not contact both of the intersecting walls of the rail or do not provide clamps stiff enough to maintain contact with both of the intersecting walls. In either instance, the tie down provides only limited load retention ability as it may not maintain its location on the bed rail. Therefore, there is a need for a vehicle bed tie-down with a large load retention capability.

SUMMARY OF THE INVENTION

The mounting devices described in further detail herein address the above-discussed problems by providing a movable tie-down device that is repositionable along the length of a vehicle bed rail. Furthermore, the tie down hook is configured to apply gripping forces to two intersecting walls of a vehicle bed rail thus providing enhanced grip to retain high loads. In particular, in preferred embodiments, the configuration of the tie-down device lends itself to be manufactured inexpensively and preferably by injection molded plastic.

In certain embodiments, a mounting device for a vehicle bed rail comprises a clamp body and a gripper assembly. The clamp body comprises a first face, a second face transverse to the first face, and an anchor hoop positioned opposite the first face and configured to increase a rigidity of the clamp body. The first and second faces are configured to overlie an edge of a vehicle bed rail having two adjoining walls. The gripper assembly has a first clamping surface and a second clamping surface. The gripper assembly is securely advanceable with respect to the clamp body such that the first and second clamping surfaces are advanceable toward corresponding first and second faces of the clamp body to clamp two adjoining walls of the edge of the vehicle bed rail.

In other embodiments, a mounting device for a vehicle bed rail of a vehicle bed comprises a clamp base and a gripper assembly. The clamp base comprises a generally L-shaped body, an anchor hoop, a clamp mount, and a rib. The generally L-shaped body portion is configured to overlie an edge of a vehicle bed rail having two transverse walls. The anchor hoop extends from the body portion toward an interior volume of the vehicle bed. The clamp mount extends from the body portion. The rib extends from the anchor hoop to a location near an end of the body portion in a first direction and to a location near an end of the clamp mount in a second direction. The gripper assembly has first and second sides configured to be advanceable toward an apex of the generally L-shaped body portion to apply clamping force to the two transverse walls of the vehicle bed rail.

In other embodiments, a vehicle mount device comprises a clamp body and a wedge. The clamp body is configured to overlie a rail of a vehicle bed. The clamp body comprises a first face, a second face transverse to the first face, a mount point, and a rib extending over the clamp body. The wedge is coupled to the clamp body. The wedge is advanceable with respect to the clamp body to define an engaged position of the mount device with respect to the rail. The wedge is configured in the engaged position to apply a gripping force to two adjoining surfaces of the rail. In the engaged position, the clamp body and the wedge are configured to maintain a location on the vehicle bed rail when a load of approximately 500 pounds is applied to the mount point along a longitudinal axis of the rail.

BRIEF DESCRIPTION OF THE DRAWINGS

FIG. 5 is a cut-away side view of the mounting device as applied in FIG. 3;

FIG. 6 is a side view of the mounting device as applied in FIG. 3;

DETAILED DESCRIPTION OF THE PREFERRED EMBODIMENT

Figure 1:
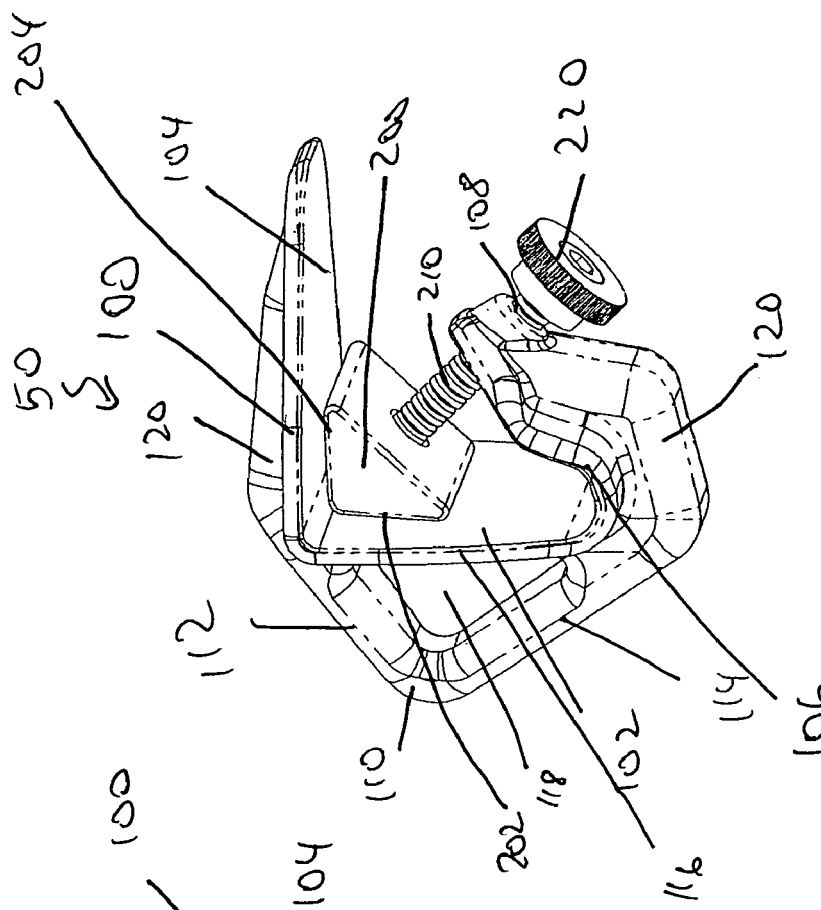
FIG. 1 is a perspective view of a mounting device for a vehicle bed rail.
Figure 2:
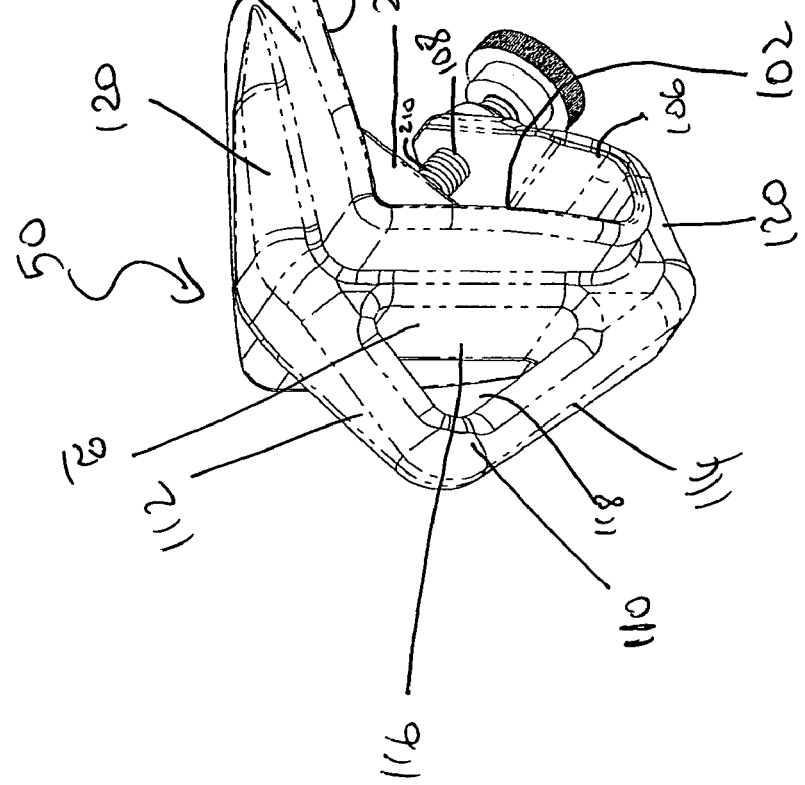
FIG. 2 is a perspective view of the mounting device of FIG. 1 from a reverse angle.
Figure 3:
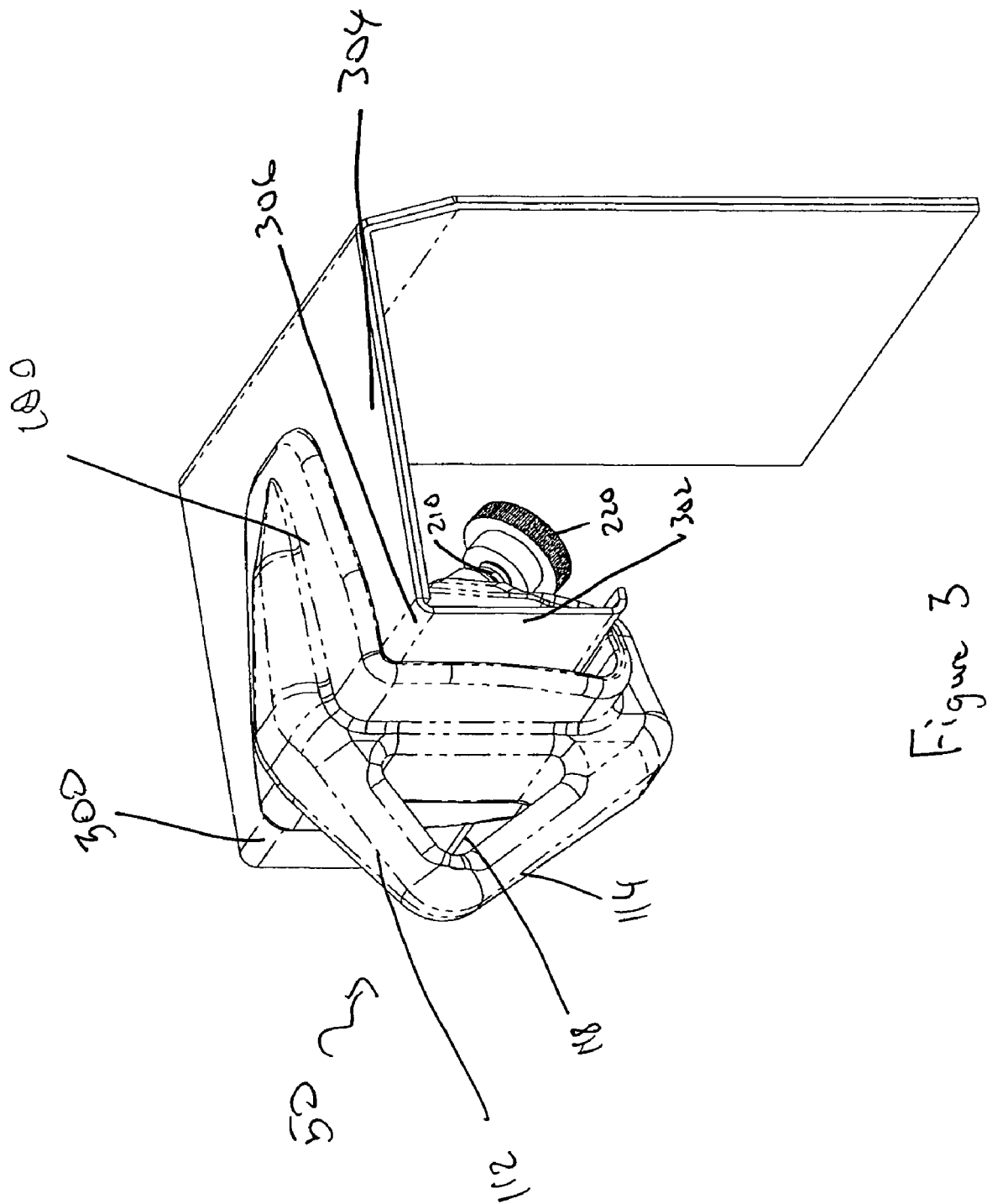
FIG. 3 is a perspective view of the mounting device of FIG. 1 as applied to a vehicle bed rail.
Figure 4:
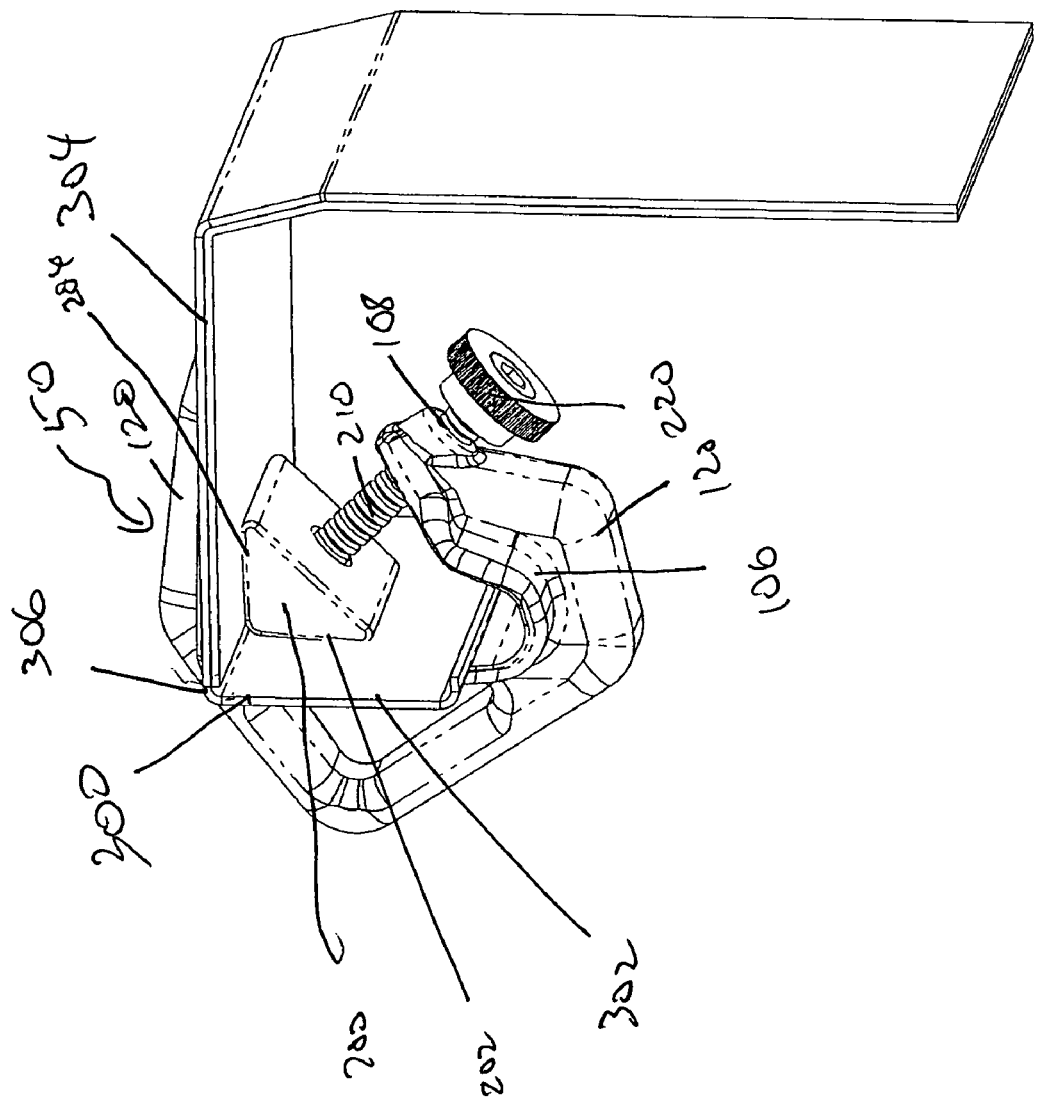
FIG. 4 is a perspective view of the mounting device as applied in FIG. 3 from a reverse angle.

With reference to FIGS. 1 and 2, an embodiment of mounting device 50 for a vehicle bed rail is illustrated in perspective view from two angles. The mounting device 50 comprises a clamp body 100 and a gripper assembly including a wedge 200. As further detailed below, the wedge 200 is securely advanceable towards the clamp body 100 such that the clamp body 100 and the wedge 200 are configured to sandwich a vehicle bed rail 300 (FIGS. 3-6) between their respective surfaces.

Clamp Body

With reference to FIG. 2, in certain embodiments, the clamp body 100 is generally L-shaped. An inner surface of the clamp body 100 comprises a first face 102 and a second face 104 transverse to the first face 102. Where terms inner and outer are used herein to describe the clamp body, it is understood that inner refers to a direction facing or contacting an adjacent vehicle bed rail, and outer refers to a direction away from an adjacent vehicle bed rail. As shown in FIGS. 3-6, the first and second faces 102, 104 are configured to overlie an edge 306 of a vehicle bed rail 300 having a first wall 302 and a second wall 304 adjoining the first wall. In certain embodiments, the first and second faces 102, 104 intersect at an angle of approximately ninety degrees to overlie a vehicle bed rail 300 having an approximately perpendicular edge 306 defined by the intersection of the first and second walls 302, 304. In other embodiments, the first and second faces 102, 104 intersect at angles other than approximately ninety degrees to overlie vehicle bed rails 300 that have non-perpendicular edges 306.

The clamp body 100 further desirably comprises a mount point 110. The mount point 110 may be disposed anywhere along an outer surface of the clamp body. Desirably, the mount point 110 is disposed on the outer surface opposite the first or second faces 102, 104 of the clamp body 100. Preferably, as illustrated in FIGS. 1-6, the mount point 110 is opposite the first face 102 of the clamp body 100. As illustrated, the mount point 110 comprises a generally triangular anchor hoop having a first leg 112 joined to an upper end of the clamp body 100, a second leg 114 joined to a lower end of the clamp body. A third leg 116 of the generally triangular anchor hoop is defined by the outer surface of the clamp body 100 underlying the mount point 110. Advantageously, such a triangular mount point 110 enhances strength and rigidity of the clamp body as it provides a truss-like reinforcement of the clamp body. Thus, the clamp body 110 is able to retain large loads and maintain position on the vehicle bed rail 300 (FIGS. 3-6). An opening 118 between the first, second, and third legs 112, 114, 116 may receive a cord, strap, cable, rope or other tie down device. While a generally triangular mount point 110 is illustrated, other configurations of mount points 110 may be used in other embodiments of mount device 50. For example, an arched anchor hoop, a post, a cleat, an open hook, an eyelet or other mount structure could be used in a mount device 50.

The clamp body 100 may further comprise a rib 120. The rib 120 is configured to increase the rigidity of the clamp body 100 such that the clamp body 100 is capable of maintaining its position when applied to a vehicle bed rail 300 even when relatively large loads are applied to the mount point 110. As illustrated, the rib 120 extends from the first leg 112 of the mount point 110 along the outer surface of the clamp body opposite the second face 104, the rib extends along the third leg 116 of the anchor hoop defined by the clamp body 100, and the rib 120 extends from the second leg 114 of the mount point 110 along the clamp body 100. Advantageously, as noted above, the rib 120 increases the rigidity of the clamp body 100. Further, since as illustrated, the rib 120 is joined to the mount point 110, and extends over a substantial portion of the outer surface of the clamp body 100, the rib 120 distributes loads from the mount point 110 substantially evenly over the clamp body 100. This distribution of loads facilitated by the rib 120 reduces the risk of structural failure where at the ends of the legs 112, 114 of the mount point 110. Moreover, as discussed in further detail below, the rib 120 also distributes loads to the wedge 200, thus increasing gripping forces when a load is applied to the mount point 110.

As depicted in FIGS. 1 and 2, the clamp body 100 further comprises a clamp extension 106 extending from a lower end of the first face 102 of the clamp body 100. In the illustrated embodiments, the clamp extension 106 extends upwards at an angle, $\Theta$, relative to the first face 102 of the clamp body 100. (FIG. 5) In the illustrated embodiment, $\Theta$ is approximately 45 degrees. The clamp extension may be configured to be a location to operatively couple the clamp body 100 to the wedge 200. The approximately 45 degree angle between the clamp extension 106 and the first face 102 of the clamp body facilitates positioning of a wedge having two sides that intersect at approximately a right angle to be advanced towards a vehicle bed rail edge 306 having an approximately perpendicular edge 306 defined by the intersection of the first and second walls 302, 304. For operative coupling with the wedge 200, the clamp extension 106 may include a hole 108 disposed adjacent an end of the clamp extension 106 opposite the first surface 102 of the clamp body 100. The hole 108 may be threaded to receive a threaded shaft 210 that may be used to provide securable advancement of the wedge 200. Preferably, the rib 120 extends over the clamp body 120 to a location near an end of the clamp extension such that loads applied to the mount point 110 are distributed over the clamp extension 106 and to the wedge 200 operatively coupled to the clamp extension 106.

The clamp body 100, including the mount point 110, clamp extension 106, and rib 120 may be formed as a single, unitary structure, such as for example, by injection molding. A unitary clamp body 100 advantageously provides a high strength and stiffness mounting device 50 that can be manufactured at a relatively low cost.

Gripper Assembly

As depicted in FIGS. 1-6, the mounting device 50 comprises a gripper assembly including a wedge 200 that is securably advanceable relative to the clamp body 100. The wedge has a first clamping surface 202 disposed on a first side and a second clamping surface 204 disposed on a second side. The wedge is advanceable towards the clamp body such that the first and second clamping surfaces 202, 204 advance towards corresponding first and second faces 102, 104 of the clamp body 100. When, as illustrated in FIGS. 3-6, the mounting device 50 is applied to a vehicle bed rail 300, the wedge 200 may be advanced towards the clamp body 100 until it reaches an engaged position in which the vehicle bed rail is sandwiched between the wedge 200 and the clamp body 100. Advantageously, with the mounting device 50 in the engaged position, the wedge 200 and clamp body 100 apply gripping force to two adjoining walls 302, 304 of the vehicle bed rail 300. This application of gripping force to two walls advantageously provides a relatively large surface area over which loads applied to the mount point 110 of the clamp body 100 are distributed. Desirably, the first and second clamping surfaces 202, 204 of the wedge 200 combined have a total surface area of at least 0.75 square inches. Preferably, the first and second clamping surfaces have a total surface area of between approximately 1 square inch and 1.5 square inches. However, it is contemplated that a mounting device 50 could be configured such that the clamping surfaces 202, 204 have less than a total of 0.75 square inches or more than 1.5 square inches of surface area. Preferably, the mounting device 50 provides sufficient gripping force to the vehicle bed rail 300 such that when engaged to a vehicle bed rail 300, the mounting device 50 maintains a position on the vehicle bed rail 300 when a load of 500 pounds is applied to the mount point 110 in a direction along a longitudinal axis of the vehicle bed rail. Additionally, this application of gripping force to two walls advantageously provides increased stability of the mounting device 50 as griping forces are applied in two transverse axes rather than a single axis.

The wedge 200 is securably advanceable with respect to the clamp body 100. In the illustrated embodiments, the wedge 200 is disposed at an end of an advancer such as a threaded shaft 210 configured to mate with a threaded hole 108 in the clamp extension 106 of the clamp body 100. It is contemplated that other advancers, such as, for example, a non-threaded shaft that is securable by a lock screw or other fastener, could be used in other embodiments of a mount device 50.

The threaded shaft 210 may include a grip wheel 220 disposed at an end of the shaft opposite the wedge 200. Advantageously, the grip wheel 220 can be easily loosened or tightened by a user, allowing the mounting device 50 to be easily installed, removed, or repositioned along a vehicle bed rail 300. Alternatively, the threaded shaft 210 may include a hex head, Phillips head, star-shaped head, or other tool interface such that the mounting device 50 requires a commonly available hand tool, or a specialized tool having a specialized interface to remove. In embodiments requiring a tool to install or remove the mounting device 50, advantageously, additional theft deterrence is provided for both the mounting device 50 and the cargo retained in the vehicle bed.

The first and second clamping surfaces 202, 204 of the wedge 200 are configured to apply a gripping force to first and second walls 302, 304 of a vehicle bed rail 300. The first and second clamping surfaces 202, 204 of the wedge 200 preferably intersect at an angle of approximately ninety degrees to apply gripping forces to a vehicle bed rail 300 having a perpendicular edge 306. In this embodiment, the wedge may comprise a generally triangular block of material having a cross-section that is an isosceles right triangle. In other embodiments, where configured for application to a vehicle bed rail 300 having a non-perpendicular edge, the wedge 200 may have a different cross-sectional profile.

Advantageously, the application of a load to the mount point 110, and the distribution of that load via the rib 120 to the clamp extension 106 to the wedge 200 increases the gripping force applied by the wedge 200 on the vehicle bed rail 300. Therefore, when a load is applied to the mount point 110, the integrated structure of the clamp body 100 increases the gripping force applied by the wedge. Advantageously, this increase in gripping forces in response to a load results in an enhanced ability of the mounting device 50 to maintain a position on a vehicle bed rail 300 despite application of relatively high loads to the mounting device. To further enhance this gripping ability, one, several, or all of the first and second faces 102, 104 of the clamp body 100 and the first and second clamping surfaces 202, 204 of the wedge 200 may comprise a roughened, textured, or otherwise high friction surface.

Application of the Mounting Device

Figure 7:
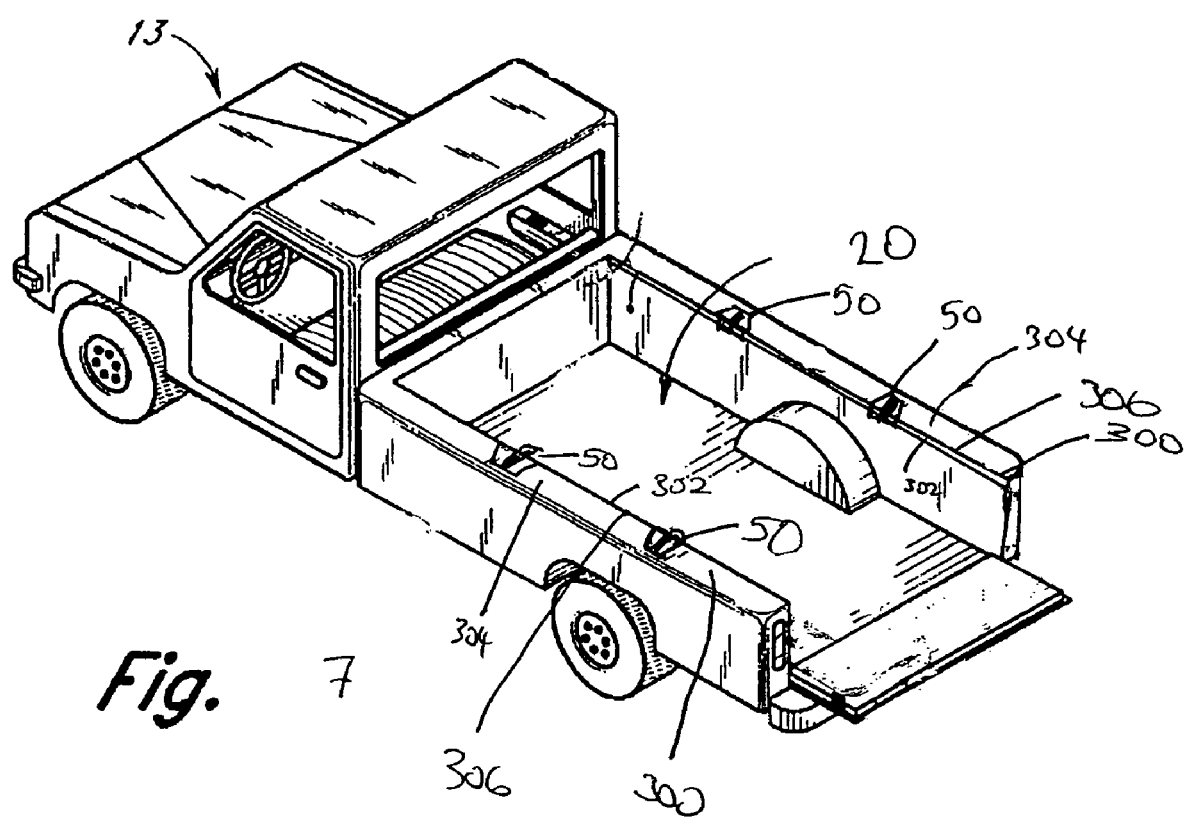
FIG. 7 is a perspective view of the mounting device of FIG. 1 as applied to a pick-up truck bed.

In various embodiments, the mounting device 50 described herein and illustrated in FIGS. 1-6 may be quickly and easily applied to a vehicle bed rail 300. With the grip wheel 220 adjusted such that the wedge 200 is retracted relative to the clamp body 100, the mounting device 50 is applied to a vehicle bed rail 300. Advantageously, the mounting device 50 may be positioned where desired along the vehicle bed rail 300 and easily repositioned as desired to secure cargo of various shapes and sizes. Once applied such that the first and second faces 102, 104 of the clamp body 100 overlie corresponding first and second walls 302, 304 of the vehicle bed rail 300, the grip wheel 220 is rotated to advance the wedge 200 towards the clamp body 100. The wedge 200 is advanced until first and second clamping surfaces 202, 204 of the wedge engage the first and second walls 302, 304 of the rail opposite the clamp body 100, thus sandwiching the vehicle bed rail. Finally, a cord, strap, rope, cable, or other tie-down device may be routed through or secured on the mount point 110 on the mounting device. It is contemplated that a plurality of mounting devices 50 can be used on a single vehicle bed and on a single vehicle bed rail to provide multiple securement points for cargo. With reference to FIG. 7, a plurality of mounting devices 50 are shown applied to a rail 300 of a cargo bed 20 of a pick up truck 13. To remove or reposition a mounting device 50, the grip wheel 220 is rotated to disengage the wedge 200 from the vehicle bed rail 300. Advantageously, the installation, repositioning, and removal of mounting devices 50 as illustrated can be accomplished quickly without the use of tools. In certain embodiments of mounting device 50 tools may be required to remove the mounting devices 50 to provide enhanced security to the vehicle's cargo.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A mounting device for a vehicle bed rail, comprising:
   a clamp body comprising:
      a first face;
      a second face transverse to the first face;
      a clamp extension extending transversely from the first face;
      a threaded hub located near an end of the clamp extension;
      an anchor hoop positioned opposite the first face and configured to increase a rigidity of the clamp body; and
      a rib extending from the anchor hoop across substantially all of the clamp extension, and
   wherein the first and second faces are configured to overlie an edge of a vehicle bed rail having two adjoining walls; and
   a gripper assembly having a first clamping surface and a second clamping surface, wherein the gripper assembly comprises a wedge disposed on an end of a threaded shaft, the threaded shaft passing through the threaded hub of the clamp body such that the wedge is securely advanceable with respect to the clamp body and such that the first and second clamping surfaces are advanceable toward the first and second faces of the clamp body to clamp two adjoining walls of the edge of the vehicle bed rail.

2. The mounting device of claim 1, wherein the anchor hoop is integrally formed with the clamp body.

3. The mounting device of claim 2, wherein the rib extends from the anchor hoop across an outer surface of the clamp body opposite the second face.

4. A mounting device for a vehicle bed rail, comprising:
   a clamp body comprising:
      a first face;
      a second face transverse to the first face;
      a clamp extension extending transversely from the first face;

a hub located near an end of the clamp extension;

an anchor hoop positioned opposite the first face and configured to increase a rigidity of the clamp body; and a rib extending from the anchor hoop across the clamp extension, and wherein the first and second faces are configured to overlie an edge of a vehicle bed rail having two adjoining walls; and a gripper assembly having a first clamping surface and a second clamping surface, wherein the gripper assembly comprises a wedge disposed on a shaft, the shaft passing through the hub of the clamp body such that the wedge is securely advanceable relative to the clamp body and such that the first and second clamping surfaces are advanceable toward the first and second faces of the clamp body, respectively, to clamp two adjoining walls of the edge of the vehicle bed rail.

5. The mounting device of claim 4, wherein a total combined surface area of the first clamping surface and the second clamping surface is at least about 0.75 square inches.

6. The mounting device of claim 4, wherein a total combined surface area of the first clamping surface and the second clamping surface is between about 1 square inch and 1.5 square inches.

7. The mounting device of claim 4, further comprising a grip wheel connected to the shaft and positioned at an end of the shaft opposite the wedge.

8. The mounting device of claim 1, wherein the gripper assembly defines a single piece which defines said first clamping surface and said second clamping surface.

9. The mounting device of claim 4, wherein the clamp extension extends from the first face at an angle of approximately forty-five degrees.

10. The mounting device of claim 9, wherein an intersection of the first and second clamping surfaces forms an angle of approximately ninety degrees.

11. The mounting device of claim 10, wherein the first face and the second face of the clamp body intersect at an angle of approximately ninety degrees.

12. The mounting device of claim 4, wherein the anchor hoop is integrally formed with the clamp body.

13. The mounting device of claim 12, wherein the rib extends from the anchor hoop across an outer surface of the clamp body opposite the second face.

14. A mounting device for a vehicle bed rail, comprising:

a clamp body comprising:

a first face;

a second face transverse to the first face;

a clamp extension extending transversely from the first face;

a hub located near an end of the clamp extension;

an anchor hoop integrally formed with the clamp body and positioned opposite the first face and configured to increase a rigidity of the clamp body; and a rib extending across the clamp extension, and wherein the first and second faces are configured to overlie an edge of a vehicle bed rail having two adjoining walls; and a gripper assembly comprising a wedge disposed on a shaft, the wedge having a first clamping surface and a second clamping surface, the wedge being securely advanceable with respect to the clamp body and such that the first and second clamping surfaces are advanceable toward the first and second faces of the clamp body, respectively, to clamp two adjoining walls of the edge of the vehicle bed rail.

15. The mounting device of claim 14, wherein the rib extends from the anchor hoop across an outer surface of the clamp body opposite the second face and the rib extends across substantially all of the clamp extension.

16. The mounting device of claim 14, wherein a total combined surface area of the first clamping surface and the second clamping surface is at least about 0.75 square inches.

17. The mounting device of claim 16, wherein the total combined surface area of the first clamping surface and the second clamping surface is between about 1 square inch and 1.5 square inches.

18. The mounting device of claim 14, further comprising a grip wheel connected to the shaft and positioned at an end of the shaft opposite the wedge, and wherein the shaft is a threaded shaft that passes through the hub such that the wedge is securely advanceable relative to the clamp body.

* * * * *